United States Patent
Park

(10) Patent No.: US 8,744,655 B2
(45) Date of Patent: Jun. 3, 2014

(54) METHOD AND SYSTEM FOR CONTROLLING TORQUE OF HYBRID VEHICLE PROVIDED WITH TWO MOTORS

(75) Inventor: Joonyoung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 318 days.

(21) Appl. No.: 13/170,569

(22) Filed: Jun. 28, 2011

(65) Prior Publication Data
US 2012/0143415 A1 Jun. 7, 2012

(30) Foreign Application Priority Data

Dec. 6, 2010 (KR) .................. 10-2010-0123450

(51) Int. Cl.
*B60W 10/08* (2006.01)
*B60W 20/00* (2006.01)
*B60K 6/26* (2007.10)

(52) U.S. Cl.
CPC ............ *B60W 10/08* (2013.01); *B60W 20/10* (2013.01); *B60K 6/26* (2013.01); *B60W 2510/083* (2013.01); *B60W 2510/081* (2013.01); *B60W 2510/244* (2013.01); *B60W 2710/083* (2013.01); *B60W 2520/10* (2013.01); *Y10S 903/945* (2013.01)
USPC .................. 701/22; 903/945; 180/65.285

(58) Field of Classification Search
USPC .......................................................... 701/22
See application file for complete search history.

(56) References Cited

U.S. PATENT DOCUMENTS

| | | | |
|---|---|---|---|
| 7,101,308 B2 * | 9/2006 | Joe et al. ............................ | 477/3 |
| 7,164,247 B2 * | 1/2007 | Joe et al. ....................... | 318/432 |
| 7,225,782 B2 * | 6/2007 | Pallett et al. ................ | 123/192.1 |
| 7,906,863 B2 | 3/2011 | Yaguchi | |
| 8,002,059 B2 * | 8/2011 | Tanishima ............... | 180/65.275 |
| 2004/0162182 A1 * | 8/2004 | Joe et al. ............................ | 477/2 |
| 2006/0017414 A1 * | 1/2006 | Joe et al. ....................... | 318/432 |
| 2007/0221421 A1 * | 9/2007 | Tanishima ................... | 180/65.2 |
| 2010/0160111 A1 * | 6/2010 | Yamanaka et al. .............. | 477/45 |

FOREIGN PATENT DOCUMENTS

| | | |
|---|---|---|
| JP | 2010111182 A | 5/2010 |
| JP | 2010188937 A | 9/2010 |
| KR | 10-0904258 | 6/2009 |

* cited by examiner

*Primary Examiner* — Shelley Chen
(74) *Attorney, Agent, or Firm* — Edwards Wildman Palmer LLP; Peter F. Corless

(57) ABSTRACT

The present invention controls torque of a hybrid vehicle that calculates power and torque of each motor when the hybrid vehicle provided with two motors operates at a transient state are used. More specifically, target power of a battery is determined. Then calculations are performed to determine target torque of the first motor, target torque of the second motor, target torque of an engine, and target speed of the engine at a steady state. The torque of the first motor at a transient state is calculated from the target torque of the second motor at the steady state and speeds of the first and second motors. Finally, torque of the second motor at the transient state is calculated from the torque of the first motor at the transient state and the speeds of the first and second motors.

12 Claims, 5 Drawing Sheets

METHOD AND SYSTEM FOR CONTROLLING TORQUE OF HYBRID VEHICLE PROVIDED WITH TWO MOTORS

CROSS-REFERENCE TO RELATED APPLICATION

This application claims priority to and the benefit of Korean Patent Application No. 10-2010-0123450 filed in the Korean Intellectual Property Office on Dec. 6, 2010, the entire contents of which are incorporated herein by reference.

BACKGROUND OF THE INVENTION (a) Field of the Invention

The present invention relates to a method and a system for controlling torque of a hybrid vehicle. More particularly, the present invention relates to a method and a system for controlling torque of a hybrid vehicle that calculates power and torque of each motor when the hybrid vehicle provided with two motors operates at a transient state.

(b) Description of the Related Art

Generally, a hybrid vehicle is a vehicle which uses an engine and a motor as power source. The hybrid vehicle may be provided with one motor and one engine, but the hybrid vehicle provided with two motors and one engine is increasingly more popular in today's market. In this case, a first motor is used for controlling engine speed and a second motor is used for compensating engine torque according to the engine speed controlled by the first motor and generating demand torque.

A control portion of the hybrid vehicle determines target driving points of the engine and the first and second motors by using vehicle's speed, the demand torque, and the state of charge (SOC). However, such target driving points of the engine and each motor are determined under the assumption that the hybrid vehicle operates at a steady state. Therefore, when a hybrid vehicle operates at a transient state, actual driving points of the engine and each motor differs from the target driving points and logic for determining driving points of the engine and each motor at the transient state may be necessary.

In order to determine the driving points of each motor at the transient state, a priority order is necessary. That is, if the driving points of two motors at the transient state are simultaneously determined, a large error may occur. Therefore, after the driving point of one motor is determined, the driving point of the other motor is determined by using the driving point of just the one motor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for controlling torque of a hybrid vehicle having advantages of determining power and torque of each motor at a transient state.

Particularly, a method and a system for controlling torque of a hybrid vehicle in which power and torque of a first motor for controlling engine speed is determined, and power and torque of a second motor for compensating engine torque and generating demand torque is determined by using the power and the torque of the first motor.

A method for controlling torque of a hybrid vehicle according to an exemplary embodiment of the present invention may determine torque and power of each motor in the hybrid vehicle provided by a first motor controlling engine speed and a second motor for compensating engine torque and generating demand torque. The method may include: determining target power of a battery based on vehicle speed, the demand torque, and SOC; calculating target torque of the first motor, target torque of the second motor, target torque of an engine, and target speed of the engine at a steady state based on the vehicle speed, the demand torque, and the target power of the battery; calculating torque of the first motor at a transient state from the target torque of the second motor at to the steady state and speeds of the first and second motors; and calculating torque of the second motor at the transient state from the torque of the first motor at the transient state and the speeds of the first and second motors.

Calculation of the torque of the first motor at the transient state may include: calculating the target power of the second motor at the steady state from the target torque of the second motor at the steady state and the speed of the second motor; calculating maximum power of the first motor at the transient state from the target power of the second motor at the steady state and power limit of a power source; and calculating maximum torque of the first motor at the transient state from the maximum power of the first motor at the transient state and the speed of the first motor.

The calculation of the torque of the first motor at the transient state may further include: calculating the target torque of the first motor at the transient state based on the target speed of the engine at the steady state and the speeds of the first and second motors; and determining the torque of the first motor at the transient state by comparing the maximum torque of the first motor and the target torque of the first motor at the transient state.

Calculation of the torque of the second motor at the transient state may include: calculating power of the first motor at the transient state from the torque of the first motor at the transient state and the speed of the first motor; calculating maximum power of the second motor at the transient state from the power of the first motor at the transient state and the power limit of the power source; and calculating maximum torque of the second motor at the transient state from the maximum power of the second motor at the transient state and the speed of the second motor.

The calculation of the torque of the second motor at the transient state may further include: calculating target torque of the second motor at the transient state based on the demand torque and the torque of the first motor at the transient state; and determining the torque of the second motor at the transient state by comparing the maximum torque of the second motor and the target torque of the second motor at the transient state. The power of the first motor at the transient state may be filtered so as to calculate the maximum power of the second motor at the transient state.

A system for controlling torque of a hybrid vehicle according to the exemplary embodiment of the present invention may include: an engine; a first motor for controlling engine speed; a second motor compensating engine torque and generating demand torque; and a control portion controlling the engine, the first motor, and the second motor. In particular, the control portion calculates torque of the first motor at a transient state by using target torque of the second motor at a steady state, and calculates torque of the second motor at the transient state by using the torque of the first motor at the transient state.

The control portion may calculate target power of the second motor at the steady state by using the target torque of the second motor at the steady state and speed of the second motor. The maximum power of the first motor is then calculated at the transient state by using the target power of the second motor at the steady state and power limit of a power source. Further, the maximum torque of the first motor is calculated at the transient state by using the maximum power of the first motor at the transient state and speed of the first motor.

The control portion may calculate target torque of the first motor at the transient state based on target speed of the engine at the steady state and the speeds of the first and second motors, and may determine the torque of the first motor at the transient state to by comparing the maximum torque of the first motor at the transient state with the target torque of the first motor.

The control portion may also calculate power of the first motor at the transient state by using the torque of the first motor at the transient state and the speed of the first motor. Then the maximum power of the second motor is calculated at the transient state by using the power of the first motor at the transient state and the power limit of the power source. The maximum torque of the second motor is calculated at the transient state by using the maximum power of the second motor at the transient state and the speed of the second motor.

The control portion may calculate target torque of the second motor at the transient state based on the demand torque and the torque of the first motor at the transient state. Then the control portion may determine the torque of the second motor at the transient state by comparing the maximum torque of the second motor at the transient state and the target torque of the second motor.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
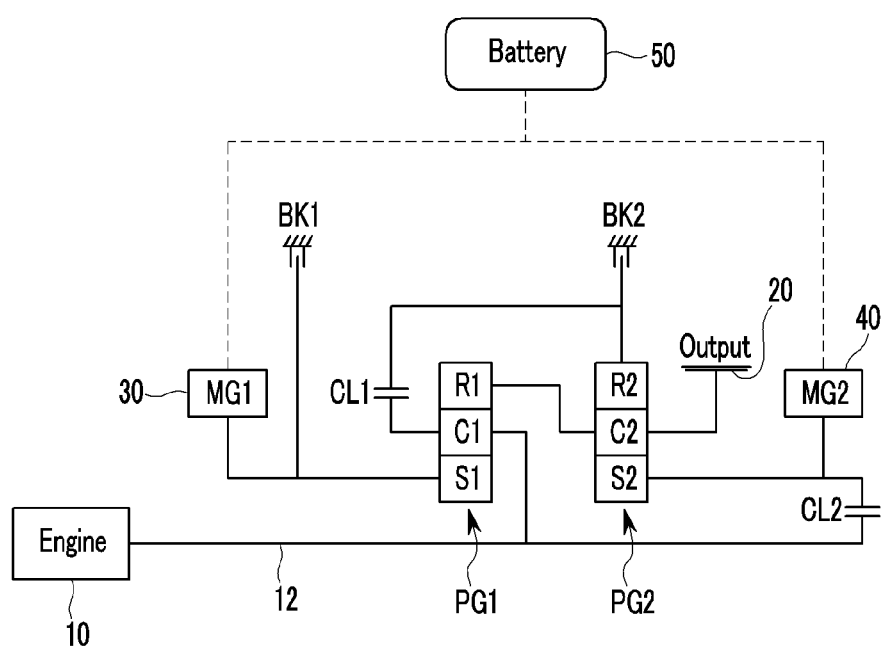
FIG. 1 is a schematic diagram illustrating a transmission of a hybrid vehicle to which a method for controlling torque according to an exemplary embodiment of the present invention can be applied.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

An exemplary embodiment of the present invention will hereinafter be described in detail with reference to the accompanying drawings.

FIG. 1 is a schematic diagram illustrating a transmission of a hybrid vehicle to which a method for controlling torque according to an exemplary embodiment of the present invention can be applied. As shown in FIG. 1, a transmission of a hybrid vehicle to which a method for controlling torque according to an exemplary embodiment of the present invention can be applied uses an engine 10 and first and second motors 30 and 40 as power sources. The engine 10 generates power by burning e.g., fuel. Various types of engines such as a gasoline engine, a diesel engine, an LPI engine may be used as the engine 10.

Power of the engine 10 is input to first and second planetary gear sets PG1 and PG2 through an input shaft 12. The first planetary gear set PG1 includes a first sun gear S1, a first planet carrier C1, and a first ring gear R1 as rotation elements thereof. The first sun gear S1 is may be always connected to the first motor 30, and the first planet carrier C1 may be always connected to the engine 10. In addition, a first brake BK1 is interposedly connected between the first sun gear S1 and the first motor 30 so as to selectively stop the first motor 30 upon demand.

The second planetary gear set PG2 includes a second sun gear S1, a second planet carrier C2, and a second ring gear R2 as rotation elements thereof. The first planet carrier C1 is selectively connected to the second ring gear R2 through a first clutch CL1, and the first ring gear R1 is directly connected to the second planet carrier C2. In addition, the second sun gear S2 is selectively connected to the engine 10 through a second clutch CL2 while at the same time being continuously connected to the second motor 40. The second ring gear R2 may be selectively stopped by a second brake BK2, and the second planet carrier C2 may be continuously connected to an output gear 20.

Operationally, the first motor 30 controls engine speed input to the first planet carrier C1 through the first sun gear S1. The first planet carrier C1 delivers the engine speed to the output gear 20 through the first ring gear R1 and the second planet carrier C2. [The speed of the first motor is combined with the speed of the engine, and the target speed (i.e., controlled by the speed of the first motor and the speed of the engine) to that is output to the output gear. Thus, if the speed of the first motor is determined, the engine speed is controlled according to the speed of the first motor and the target speed.

The second motor 40 compensates engine torque input through the first planet carrier C1 and engine torque selectively input through the second sun gear S2 so that demand torque is output through the output gear 20. That is, the second motor 40 compensates the engine torque so as to generate the demand torque accordingly.

A battery 50 supplies electricity/power to the first and second motors 30 and 40 while operating in a first mode and is charged by electricity generated at the first and second motors 30 and 40 under a predetermined driving condition in a second mode to thereby keep the battery charge above a certain level.

Figure 2:
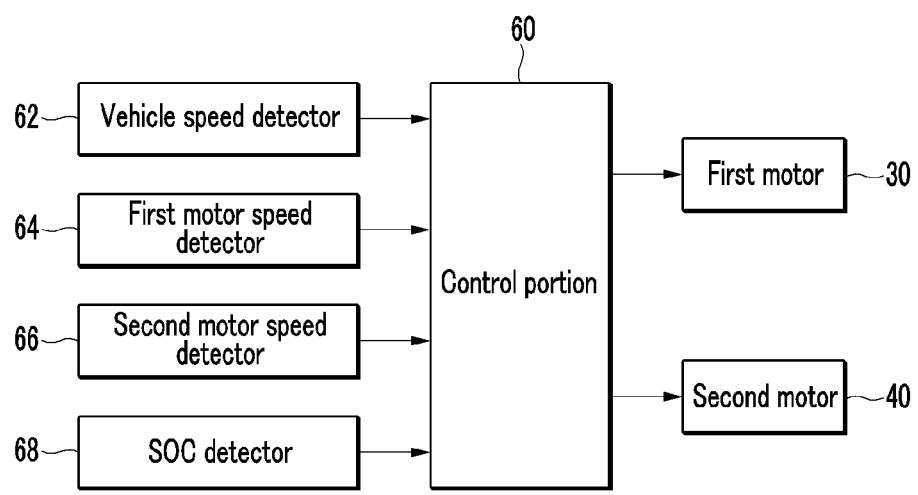
FIG. 2 is a block diagram of a system for controlling torque of a hybrid vehicle to according to an exemplary embodiment of the present invention.

FIG. 2 is a block diagram of a system for controlling torque of a hybrid vehicle according to an exemplary embodiment of the present invention. As shown in FIG. 2, a system for controlling torque of a hybrid vehicle according to an exemplary embodiment of the present invention includes a vehicle speed detector 62, a first motor speed detector 64, a second motor speed detector 66, an SOC detector 68, a control portion 60, and the first and second motors 30 and 40. In addition, a plurality of sensors for detecting operations of the engine 10, the transmission, the first and second motors 30 and 40, and the battery 50 may be further included.

In this embodiment, the vehicle speed detector 62 detects the current vehicle speed and delivers a signal corresponding thereto to the control portion 60. The first motor speed detector 64 detects the current speed of the first motor 30 and delivers a signal corresponding thereto to the control portion 60. The second motor speed detector 66 detects the current speed of the second motor 40 and delivers a signal corresponding thereto to the control portion 60. The SOC detector 68 detects SOC of the battery 50 and delivers a signal corresponding thereto to the control portion 60.

The control portion 60 determines driving points of the engine and each motor at a steady state based on the vehicle speed, the speeds of the first and second motors 30 and 40, and the SOC of the battery 50, and determines driving points of each motor at a transient state. The control portion 60 controls operations of the engine 10, the first motor 30, and the second motor 40 according to the determined driving points.

Hereinafter, a method for controlling torque of a hybrid vehicle according to an exemplary embodiment of the present invention will be described in detail with reference to FIG. 3 to FIG. 5.

Figure 3:
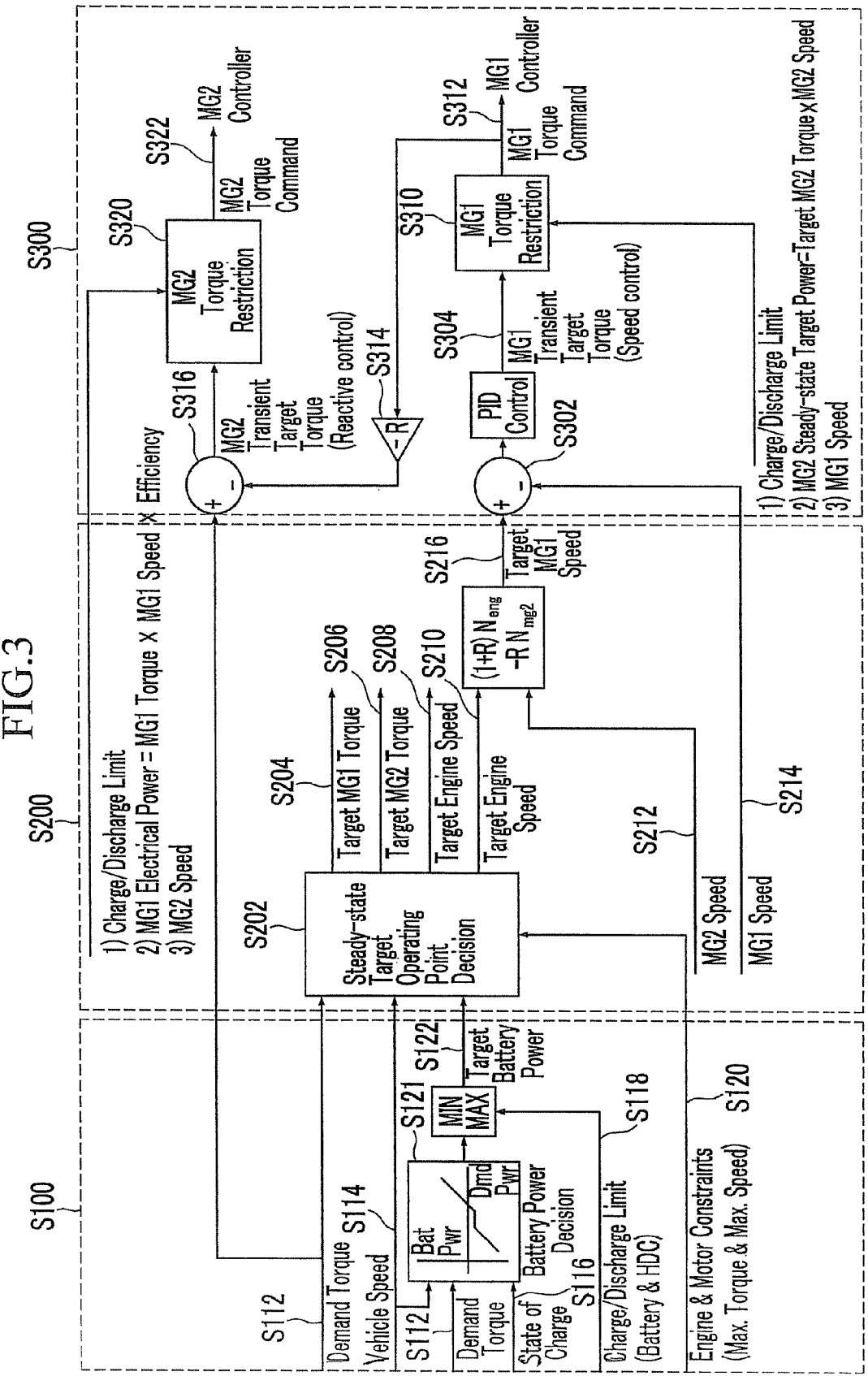
FIG. 3 is a flowchart of a method for controlling torque of a hybrid vehicle according to an exemplary embodiment of the present invention.
Figure 4:
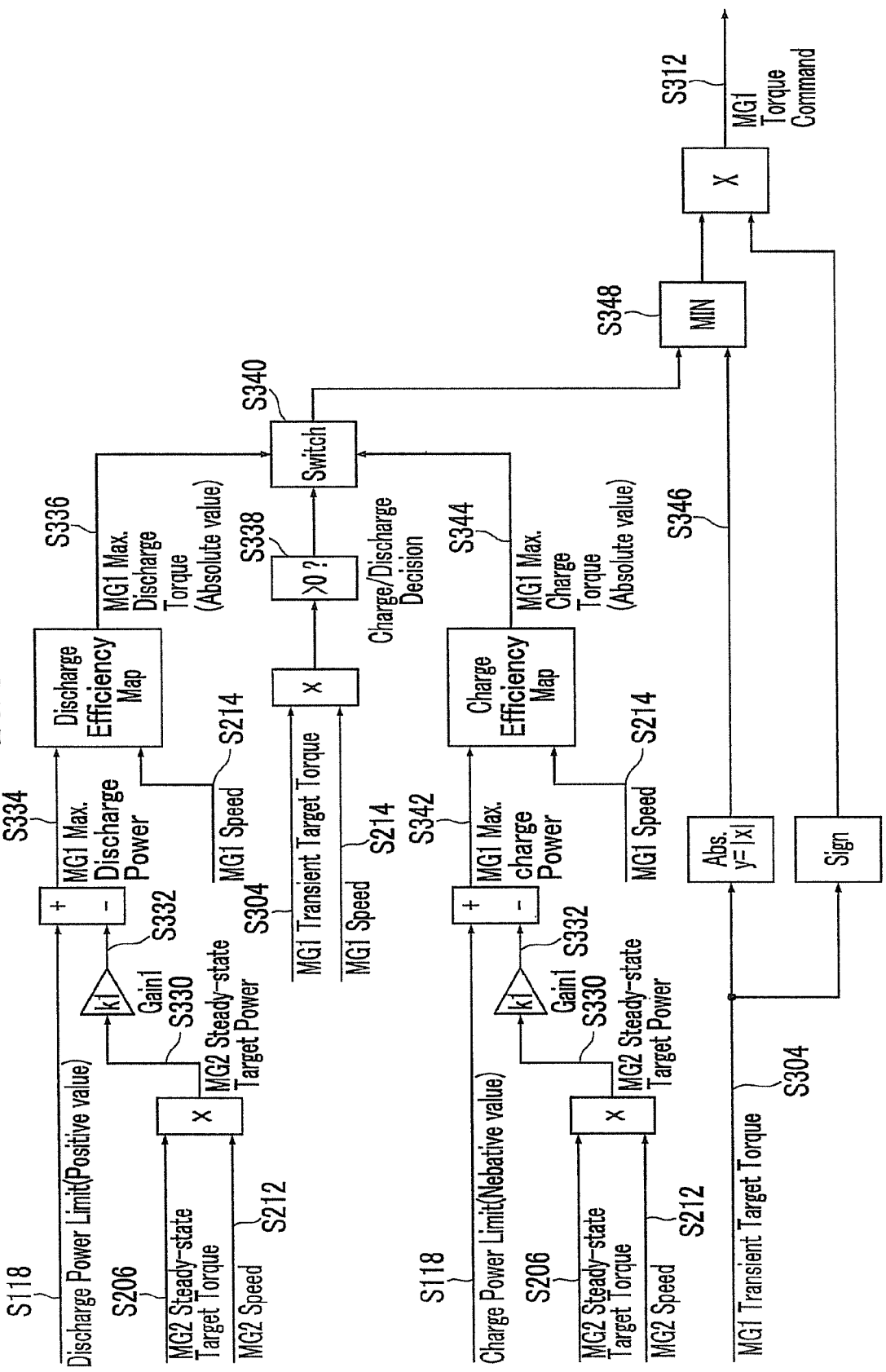
FIG. 4 is a flowchart illustrating calculation of power and torque of the first motor according to an exemplary embodiment of the present invention.
Figure 5:
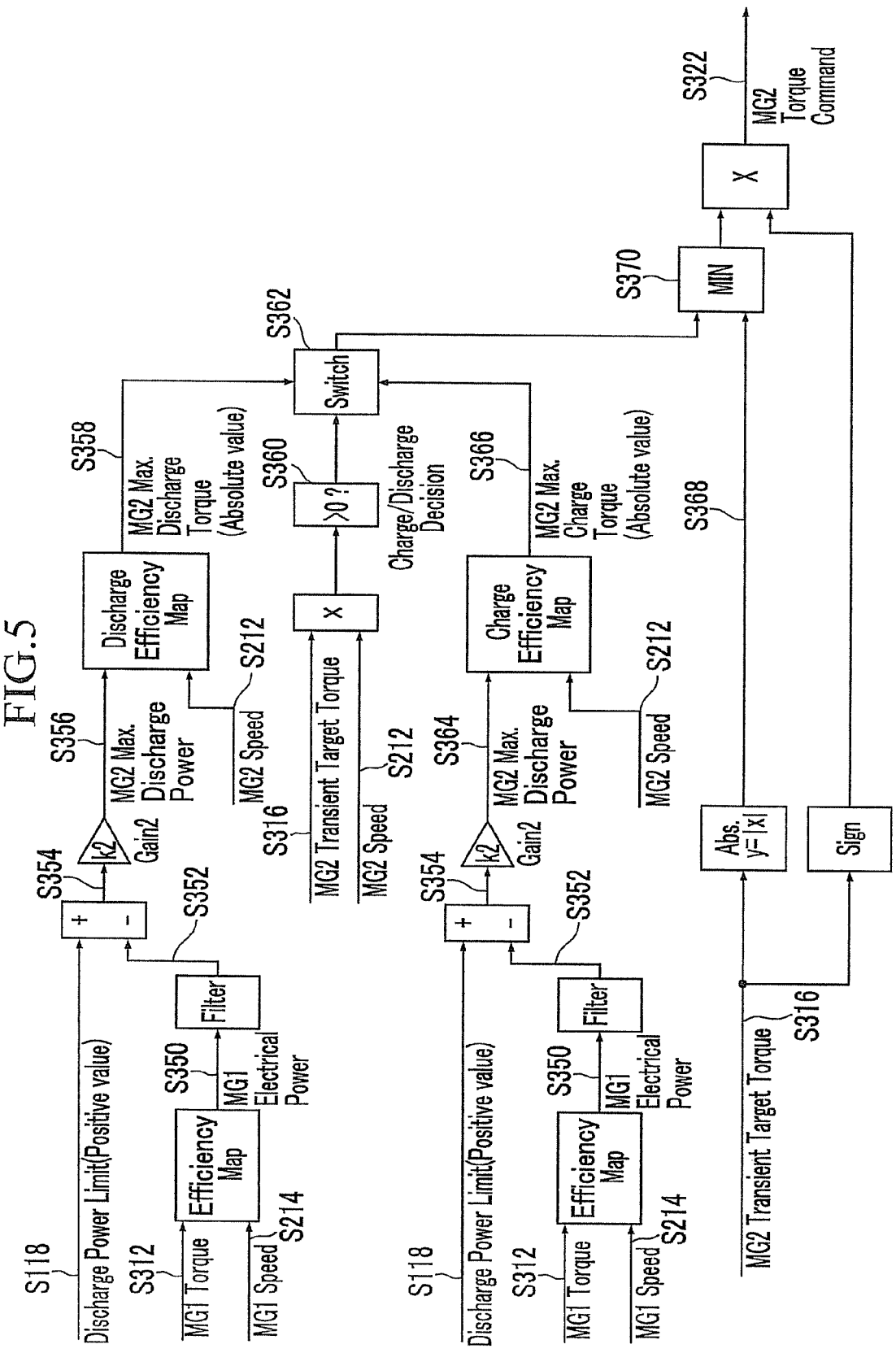
FIG. 5 is a flowchart illustrating calculation of power and torque of the second motor according to an exemplary embodiment of the present invention.

FIG. 3 is a flowchart of a method for controlling torque of a hybrid vehicle according to an exemplary embodiment of the present invention, FIG. 4 is a flowchart illustrating calculation of power and torque of the first motor according to an exemplary embodiment of the present invention, and FIG. 5 is a flowchart illustrating calculation of power and torque of the second motor according to an exemplary embodiment of the present invention.

As shown in FIG. 3, a method for controlling torque of a hybrid vehicle according to an exemplary embodiment of the present invention includes determining target power of the battery at a step S100, calculating driving points of the engine 10 and each motor 30 and 40 at the steady state at a step S200, and calculating driving points of each motor 30 and 40 at the transient state at a step S300.

The control portion 60 calculates demand torque based on the current vehicle speed, a position of an accelerator pedal, and engine speed at a step S112, receives the current vehicle speed from the vehicle speed detector 62 at a step S114, and receives the SOC of the battery 50 from the SOC detector 68 at a step S116. In addition, the control portion 60 receives a charge/discharge limit at a step S118, and receives constraint conditions of the engine 10 and each motor 30 and 40 at step S120. The charge/discharge limit and the constraint conditions of the engine 10 and each motor 30 and 40 may be stored in the control portion 60 for later use in for example RAM memory.

The control portion 60 then determines power of the battery 50 from the vehicle speed, the demand torque, and the charge/discharge limit at a step S121, and determines target power of the battery 50 by comparing the power of the battery 50 with the charge/discharge limit at a step S122.

After that, the control portion 60 determines the target driving point at the steady state by using the demand torque, the vehicle speed, the target power of the battery 50, and the constraint conditions of the engine 10 and each motor 30 and 40 at a step S202. That is, target torque of the first motor 30 at the steady state is calculated at a step S204, the target torque of the second motor 40 at the steady state is calculated at a step S206, the target torque of the engine 10 at the steady state is calculated at a step S208, and target speed of the engine 10 at the steady state is calculated at a step S210. In addition, the control portion 60 receives the speed of the second motor 40 from the second motor speed detector 66 at a step S212, and receives the speed of the first motor 30 from the first motor speed detector 64 at a step S214.

Next, the control portion 60 calculates target speed of the first motor 30 from the target speed of the engine 10 at the steady state and the speed of the second motor 40 at a step S216, and subtracts the speed of the first motor 30 from the target speed of the first motor 30 at a step S302.

The control portion 60 calculates the target torque of the first motor 30 at the transient state by using the difference between the target speed of the first motor 30 and the speed of the first motor 30 at a step S304, and limits torque of the first motor 30 by using the target torque of the first motor 30, the charge/discharge limit of the first motor 30 (determined from the charge/discharge limit of a power source (the battery 50)), the target power of the second motor 40 at the steady state, and the speed of the first motor 30 at a step S310. Accordingly, torque of the first motor 30 at the transient state is calculated at a step S312.

In addition, the control portion 60 calculates target torque of the second motor 40 at the transient state by subtracting the torque of the first motor 30 at the transient state from the demand torque at a step S316. In addition, the control portion 60 limits torque of the second motor 40 by using the target torque of the second motor 40 at the transient state, the charge/discharge limit of the second motor 40, the power of the first motor at the transient state, and the speed of the second motor 40 at a step S320. Accordingly, the torque of the second motor 40 at the transient state is calculated at a step S322.

Referring to FIG. 4, processes for calculating the torque of the first motor 30 at the transient state will be described in detail.

The control portion 60 calculates target power of the second motor 40 at the steady state by multiplying the target torque of the second motor 40 at the steady state and the speed of the second motor 40 at a step S330, and multiplies a first gain to the target power of the second motor 40 at the steady state at a step S332.

The control portion 60 calculates maximum discharge power of the first motor 30 at the transient state from discharge power limit of the first motor 30, the target power of the second motor 40 at the steady state, and the first gain at a step S334. In addition, the control portion 60 calculates maximum discharge torque of the first motor 30 at the transient state by using the maximum discharge power of the first motor 30 at the transient state and the speed of the first motor 30 at a step S336. The maximum discharge torque in this case may be calculated from a predetermined discharge efficiency map.

Similar to the calculation of the maximum discharge torque, the control portion 60 calculates maximum charge torque of the first motor 30 at the transient state at a step S344. That is, the control portion 60 calculates the maximum charge power of the first motor 30 at a transient state from the charge power limit of the first motor 30, the target power of the second motor 40 at the steady state, and the first gain at a step S342, and calculates the maximum charge torque of the first motor 30 at the transient state by using the maximum charge power of the first motor 30 at the transient state and the speed of the first motor 30 at a step S344.

The control portion 60 determines whether charge or discharge occurs by multiplying the target torque of the first motor 30 at the transient state and the speed of the first motor 30 at a step S338, and determines whether the maximum charge torque or the maximum discharge torque of the first motor 30 at the transient state is used at a step S340 based on whether the sign is positive (+) or negative (−), respectively.

The control portion 60 calculates absolute value of the target torque of the first motor 30 at the transient state at a step S346, and compares the maximum charge torque or the maximum discharge torque determined at the step S340 with the absolute value of the target torque at a step S348. After that, the control portion 60 calculates the torque of the first motor 30 at the transient state at the step S312. At S348, a minimum value is chosen. Since the step S348 is performed without sign, the sign is added at the step S312 as shown in FIG. 4.

Referring to FIG. 5, processes for calculating the torque of the second motor 40 at the transient state will be described in detail.

The control portion 60 calculates power of the first motor 30 at the transient state from the torque of the first motor 30 at the transient state and the speed of the first motor 30 at a step S350, and filters the power of the first motor 30 at the transient state at a step S352 such that the torque of the second motor 40 at the transient state is not affected by fluctuation of the power of the first motor 30 at the transient state.

The control portion 60 subtracts the filtered power of the first motor 30 at the transient state from discharge power limit of the second motor 40 at a step S354, and calculates maximum discharge power of the second motor 40 at the transient state from the discharge power limit of the second motor 40 (calculated from the charge/discharge limit of the power source (the battery 50)), the filtered power of the first motor 20 at the transient state, and a second gain at a step S356. In addition, the control portion 60 calculates maximum discharge torque of the second motor 40 at the transient state by using the maximum discharge power of the second motor 40 at the transient state and the speed of the second motor 40 at a step S358. The maximum discharge torque is calculated from the predetermined discharge efficiency map.

Similar to calculation of the maximum discharge torque, the control portion 60 calculates maximum charge torque of the second motor 40 at the transient state at a step S366. That is, the control portion 60 calculates maximum charge power of the second motor 40 at the transient state from charge power limit of the second motor 40, the filtered power of the first motor 30 at the transient state, and the second gain at a step S364, and calculates the maximum charge torque of the second motor 40 at the transient state by using the maximum charge power of the second motor 40 at the transient state and the speed of the second motor 40 at the step S366.

After that, the control portion 60 determines whether charge or discharge occurs by multiplying the target torque of the second motor 40 at the transient state and the speed of the second motor 40 at a step S360, and determines whether the maximum charge torque or the maximum discharge torque of the second motor 40 at the transient state is used at a step S362 based on whether the sign is positive (+) or negative (−), respectively.

The control portion 60 calculates absolute value of the target torque of the second motor 40 at the transient state at a step S368, and compares the maximum charge torque or the maximum discharge torque determined at the step S362 with the absolute value of the target torque at a step S370 based on whether the sign is positive (+) or negative (−), respectively. After that, the control portion 60 calculates the torque of the second motor 40 at the transient state at a step S322.

Furthermore, the control mechanisms/portions of the present invention may be embodied as computer readable media on a computer readable medium containing executable program instructions executed by a processor. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion, e.g., wirelessly to a remote server.

As described above, since power and torque of a second motor generating final demand torque is determined after power and torque of a first motor controlling engine to speed is determined, optimal torque of each motor at a transient state may be calculated according to an exemplary embodiment of the present invention.

In addition, since each motor and an engine are controlled by using optimal torque of each motor, fuel economy may be improved and an SOC may be managed stably.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling torque of a hybrid vehicle provided with a first motor controlling engine speed and a second motor for compensating engine torque and generating demand torque, the method comprising:
   determining target power of a battery based on vehicle speed, demand torque, and state of charge (SOC);
   calculating target torque of the first motor, a target torque of the second motor, a target torque of an engine, and a target speed of the engine at a steady state based on vehicle speed, demand torque, and the target power of the battery;
   calculating torque of the first motor at a transient state from the target torque of the second motor at the steady state and speeds of the first and second motors; and
   calculating torque of the second motor at the transient state from the torque of the first motor at the transient state and the speeds of the first and second motors.

2. The method of claim 1, wherein calculation of the torque of the first motor at the transient state comprises:
   calculating a target power of the second motor at the steady state from the target torque of the second motor at the steady state and the speed of the second motor;
   calculating maximum power of the first motor at the transient state from the target power of the second motor at the steady state and power limit of a power source; and
   calculating maximum torque of the first motor at the transient state from the maximum power of the first motor at the transient state and the speed of the first motor.

3. The method of claim 2, wherein the calculation of the torque of the first motor at the transient state further comprises:
   calculating the target torque of the first motor at the transient state based on the target speed of the engine at the steady state and the speeds of the first and second motors, respectively; and
   determining torque of the first motor at the transient state by comparing the maximum torque of the first motor and the target torque of the first motor at the transient state.

4. The method of claim 1, wherein calculation of the torque of the second motor at the transient state comprises:
- calculating power of the first motor at the transient state from the torque of the first motor at the transient state and the speed of the first motor;
- calculating maximum power of the second motor at the transient state from the power of the first motor at the transient state and the power limit of the power source; and
- calculating maximum torque of the second motor at the transient state from the maximum power of the second motor at the transient state and the speed of the second motor.

5. The method of claim 4, wherein the calculation of the torque of the second motor at the transient state further comprises:
- calculating target torque of the second motor at the transient state based on the demand torque and the torque of the first motor at the transient state; and
- determining the torque of the second motor at the transient state by comparing the maximum torque of the second motor and the target torque of the second motor at the transient state.

6. The method of claim 4, wherein the power of the first motor at the transient state is filtered so as to calculate the maximum power of the second motor at the transient state.

7. A non-transitory computer readable medium containing executable program instructions executed by a processor, comprising:
- program instructions that determine target power of a battery based on vehicle speed, demand torque, and state of charge (SOC);
- program instructions that calculate target torque of the first motor, a target torque of the second motor, a target torque of an engine, and a target speed of the engine at a steady state based on vehicle speed, demand torque, and the target power of the battery;
- program instructions that calculate torque of the first motor at a transient state from the target torque of the second motor at the steady state and speeds of the first and second motors; and
- program instructions that calculate torque of the second motor at the transient state from the torque of the first motor at the transient state and the speeds of the first and second motors.

8. The non-transitory computer readable medium of claim 7, wherein the program instructions that calculate the torque of the first motor at the transient state further comprise:
- program instructions that calculate target power of the second motor at the steady state from the target torque of the second motor at the steady state and the speed of the second motor;
- program instructions that calculate maximum power of the first motor at the transient state from the target power of the second motor at the steady state and power limit of a power source; and
- program instructions that calculate maximum torque of the first motor at the transient state from the maximum power of the first motor at the transient state and the speed of the first motor.

9. The non-transitory computer readable medium of claim 8, wherein the program instructions that calculate the torque of the first motor at the transient state further comprises:
- program instructions that calculate the target torque of the first motor at the transient state based on the target speed of the engine at the steady state and the speeds of the first and second motors, respectively; and
- program instructions that determine the torque of the first motor at the transient state by comparing the maximum torque of the first motor and the target torque of the first motor at the transient state.

10. The non-transitory computer readable medium of claim 9, wherein the program instructions that calculate the torque of the second motor at the transient state comprises:
- program instructions that calculate power of the first motor at the transient state from the torque of the first motor at the transient state and the speed of the first motor;
- program instructions that calculate maximum power of the second motor at the transient state from the power of the first motor at the transient state and the power limit of the power source; and
- program instructions that calculate maximum torque of the second motor at the transient state from the maximum power of the second motor at the transient state and the speed of the second motor.

11. The non-transitory computer readable medium of claim 10, wherein the program instructions that calculate the torque of the second motor at the transient state further comprises:
- program instructions that calculate target torque of the second motor at the transient state based on the demand torque and the torque of the first motor at the transient state; and
- program instructions that determine the torque of the second motor at the transient state by comparing the maximum torque of the second motor and the target torque of the second motor at the transient state.

12. The non-transitory computer readable medium of claim 10, further comprising program instructions that filter the power of the first motor at the transient state so as to calculate the maximum power of the second motor at the transient state.

* * * * *